Oct. 31, 1961  G. M. MARR  3,007,135
COMBINATION AUDIBLE AND VISIBLE SIGNAL FOR SHIPS
Filed July 17, 1958  2 Sheets-Sheet 1
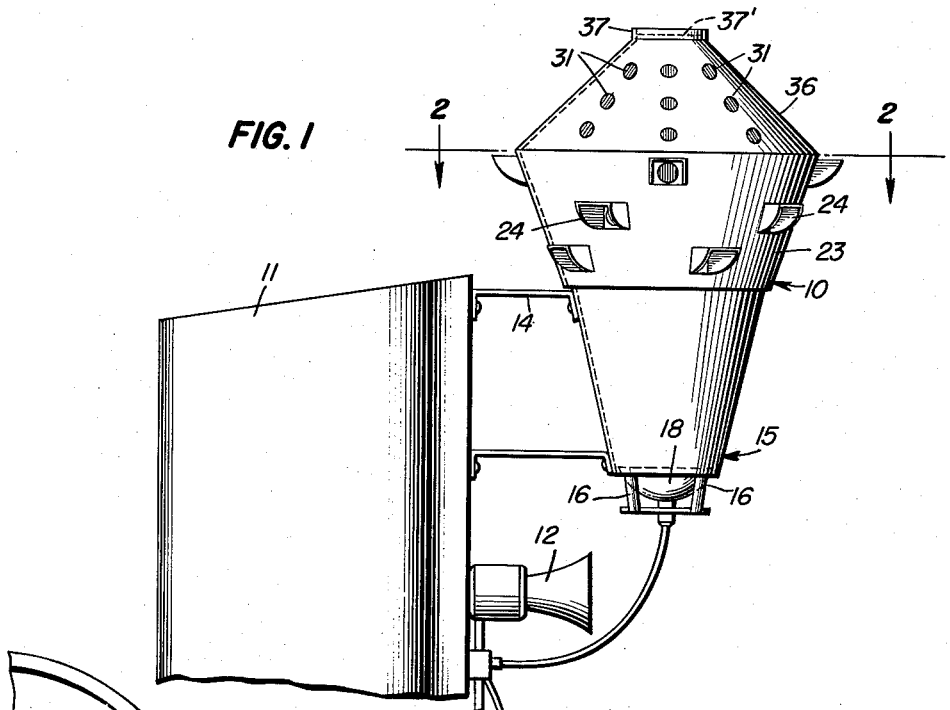
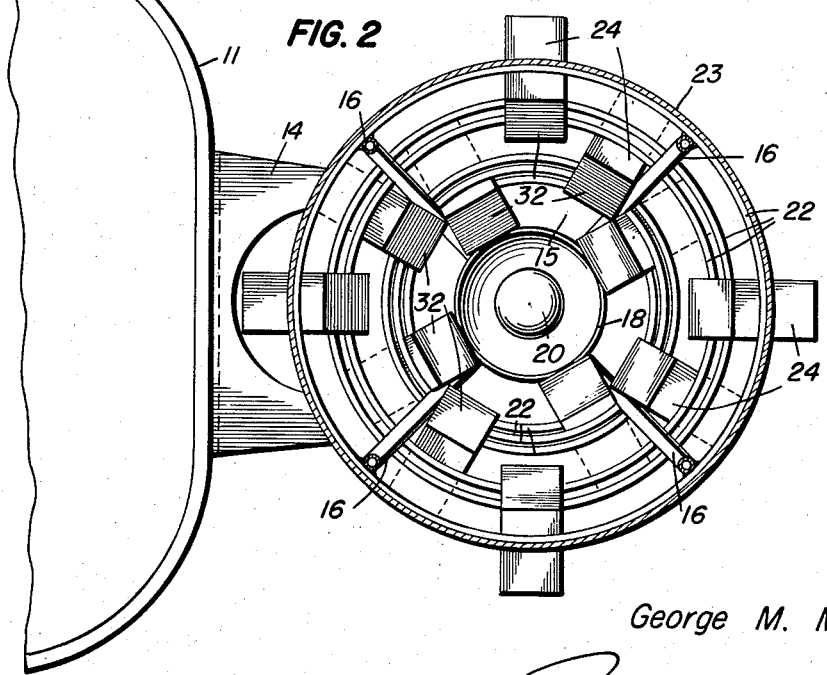
INVENTOR
George M. Marr Oct. 31, 1961  G. M. MARR  3,007,135
COMBINATION AUDIBLE AND VISIBLE SIGNAL FOR SHIPS
Filed July 17, 1958  2 Sheets-Sheet 2
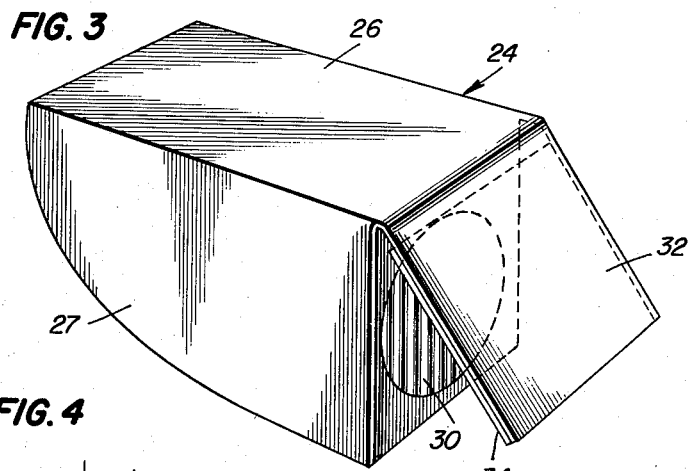
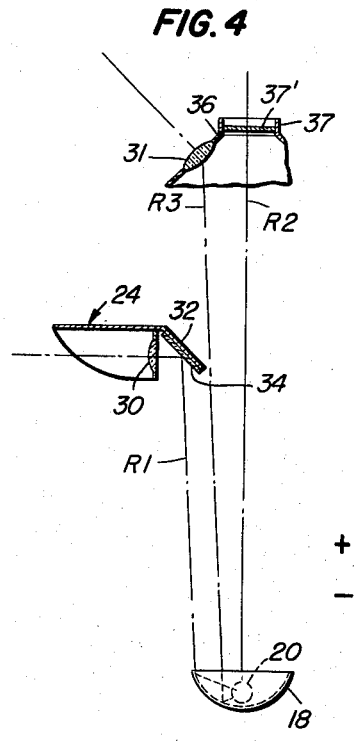
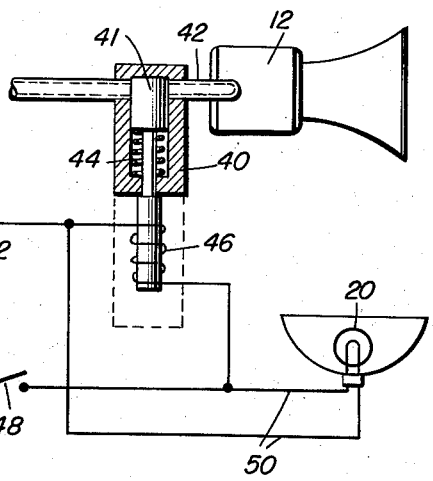
INVENTOR
George M. Marr
BY
ATTORNEY

United States Patent Office 3,007,135
Patented Oct. 31, 1961

3,007,135
COMBINATION AUDIBLE AND VISIBLE SIGNAL FOR SHIPS
George M. Marr, 170—40 Highland Ave., Jamaica 32, N.Y.
Filed July 17, 1958, Ser. No. 749,141
4 Claims. (Cl. 340—84)

This invention relates to signal devices and more particularly to a combination audible and visible light signal for ships.

It is a primary objective of this invention to provide a combination whistle and visible ship signalling device which will lessen the danger of collision of vessels afloat.

Another objective of the invention is to provide a combination whistle and visible light signal for ships whose light beam is fog penetrating and visible throughout 360 degrees of the horizon.

A further objective of this invention is to provide a combination audible and visible ship signalling device which projects sound and light signals in synchronism.

A still further objective of the invention is to provide a combination audible and visible ship signalling device having visible signals of distinct character to preclude possibility of confusion with any other signal or light on board ship or on shore.

Yet another objective of the invention is to provide a combination audible and visible ship signalling device, capable of being mounted at an elevated point on a ship to increase its visibility, and provided with means to protect the light projector elements from the effects of weather.

The novel features that are considered characteristic of the invention are set forth with particularity in the appended claims. The invention itself, however, both as to its organization and its method of operation, together with additional objects and advantages thereof, will best be understood when read in connection with the accompanying drawing, wherein like reference characters indicate like parts throughout the several figures and in which:

FIG. 1 is a side elevational view of a signalling device, according to the invention, mounted at the top of a ship's smokestack fragmentarily shown;

FIG. 2 is an enlarged top plan view of a portion of the signalling device taken on line 2—2 of FIG. 1;

FIG. 3 is an enlarged perspective view of one of the lens-reflector units;

FIG. 4 is a diagram showing the path of a ray of light projected from the device, and FIG. 5 is a circuit diagram showing the means for electrically connecting the whistle and light projector to operate in synchronism.

Referring now particularly to FIGS. 1–3, the combination audible and visible ship signalling device is shown as comprising a light projector 10 and a whistle or horn 12, both preferably mounted at a high elevation on a ship and conveniently mounted at the top of the ship's smoke or exhaust stack 11. The light projector 10 is secured to the stack or other support by suitable means, such as brackets 14.

The projector 10 comprises an open, truncated, cage-type conical frame formed by spaced angularly disposed, upstanding bars 16, and partially enclosed in a sheet metal conical housing 15. A high candle power lamp 20 is encased in a weathertight housing 18 removably secured in the bottom of housing 15. The lamp 20 is disposed with its axis of light projection extending vertically along the axis of the housing 15. A plurality of annular reflector supports 22, of circular shape, each in a different horizontal plane, are suitably fastened to the upper parts of the frame bars 16. Each support 22 carries a plurality of spaced, lens-reflector units 24 which project through fitted openings in a truncated conical ring 23.

The lens-reflector units 24 are identical to each other and, therefore, only one will be described. Unit 24, FIG. 3, comprises a weather-protection housing having a top surface 26 and two downturned surfaces 27. A lens 30 is supported between the surfaces 27 in any suitable manner. One end of housing 24, the left end as viewed in FIG. 3, is open to permit egress of light from the lens 30. The opposite end wall 32 is inclined outwardly at a 45 degree angle to the vertical, and has a planar mirror or reflecting surface 34 of silvered glass, metal or other highly efficient reflective material affixed to its inner surface. Lens 30 is mounted in housing 24 in such manner as to receive reflected rays from mirror 34 along the lens axis, which is approximately parallel to the top surface 26 and which is projected through the open end of the housing 24.

Preferably, each lens 30 is colored amber to distinguish the refracted light rays from ordinary ship lights, and each lens is provided with vertical prisms to spread the beams horizontally. As indicated in FIG. 2, each support 22 may mount four lens-reflector units 24 spaced 90 degrees apart, and the units in one support ring may be displaced by 30 degrees with reference to those of the next support ring. In this manner, no one unit will obstruct passage of light from lamp 20 to another unit. Removably secured to the top-most reflector support 22 and ring 23 in any suitable manner is an upstanding conical housing 36, FIG. 1, which terminates in a ring 37 holding a glass disc or lens 37'. A plurality of individual, spaced lenses 31 similar to the lenses 30 and which project light upwardly are secured in openings in housing portion 36. The housing parts 18, 15, 23, 36 and 37 form a completely enclosed weatherproof housing except for the openings through which the units 24 are fitted. However, units 24 are themselves weather protecting and they may be sealed in the housing openings so that the light projection elements of the device are entirely protected.

FIG. 4 illustrates the path 21 of a single ray of light traveling vertically from and parallel to the axis of lamp 20. Ray $R^1$ will be deflected upon striking one of the reflectors 34. Since the angle of light incidence to a reflection surface equals the angle of reflection, and the reflectors are disposed at 45 degrees to the vertical, the resultant reflected ray is horizontal and passes through lens 30 parallel to its axis. The lens having vertical refracting prisms on one or both of its surfaces will diffuse the bundle of rays, which strike the lens, spreading them horizontally. With the arrangement of lens-reflector units shown in FIGS. 1 and 2, a considerable proportion of the vertical light beam projected by lamp 20 will impinge upon one or another of the units, so that the resultant horizontal beam will be quite intense.

Due to the spread of the individual beams refracted by the lenses, the individual beams at a predetermined distance from the device will overlap, so that the resultant horizontal beam at such distance is continuous through 360 degrees around the axis of projector 10. The portion $R^2$ of the vertical light beam from lamp 20 which does not strike one of the reflectors 34, or a portion of one of the housings 24, passes upwardly through the projector 10 and is projected vertically through the glass or lens 37' except for that portion $R^3$ of the light beam which strikes the lenses 31 mounted in the inclined lens supports 36. These, of course, will have the effect of coloring a portion of the vertical escaping light and of diffusing the vertical beam to widen it considerably.

To electrically operate whistle 12 and lamp 20 in synchronism, the whistle may be provided with a solenoid operated air valve 40, FIG. 5. The air passage 42 to the whistle 12 is obstructed by valve element 41 and normally maintained closed by a coil spring 44. When the solenoid coil 46, connected to a source of electric energy by leads 52, is energized by closing switch 48, valve element 41 is attracted against the pressure of spring 44 to permit compressed air to pass through passage 42 into the whistle 12 and sound the whistle. The filament of the flood lamp 20 is connected in parallel with the solenoid coil 46 by leads 50 so that each time the whistle blows, the flood lamp will light. As a result, when the whistle is blown, whether with blasts of long or short duration, a beam of white and yellow light, having vertical and horizontal components, is projected from the device 10 exactly in synchronism with the blasts of the horn.

To operate the described ship's signalling device, it is necessary only to close and open switch 48 repetitively to produce blasts on horn 12 and synchronized light signals from the projector 10. It will be apparent that the resultant signal is visible at night, in inclement weather and under unfavorable conditions, such as low hanging clouds, mist or fog. If the sound is not heard, there is high probability that the flashing light will be seen from another vessel and thus serve to warn of the presence of the ship giving the signal. Since the projected light beam is intermittent in character, and is otherwise distinctly different from other lights on board ships, buoys or lighthouses, there will be no danger of confusing the light signal with such other lights.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. A signal device for ships, comprising a housing having a vertical axis, a light projector mounted at the bottom of said housing to project a light beam along said housing axis, openings in said housing in spaced relation completely about the periphery thereof, a plurality of vertically spaced supports disposed horizontally in said housing above said projector, each of these supports carrying a plurality of spaced reflectors and diffusing lenses for intercepting and projecting portions of the light beam horizontally through said housing openings, said plurality of reflectors and diffusing lenses being mounted in pairs in protective reflector housings, each of said reflector housings comprising a casing open at the bottom and one side, the side opposite said open side being inclined outwardly and mounting a planar reflector, and downturned walls on said casing between which is mounted a lens whose axis passes through the open side of the casing and one of said housing openings.

2. A signal device for ships, comprising a housing having a vertical axis, openings in said housing in spaced relation completely about the periphery thereof, a light projector mounted at the bottom of said housing to project a light beam along said housing axis, a plurality of vertically spaced supports disposed horizontally in said housing above said projector each of said supports mounting a plurality of reflector-lens units for intercepting and projecting portions of the light beam horizontally through said housing openings, said reflector-lens units each comprising a casing having a top wall and downturned side walls open at the bottom and one side being inclined outwardly for mounting a reflector, and a lens mounted between said downturned side walls and having an axis passing through said housing openings.

3. A signal device for ships, comprising a tubular housing having a vertical axis, said housing having a lower portion tapering upwardly and outwardly and an upper portion tapering upwardly and inwardly, a light projector mounted at the bottom of said housing to project a light beam along said housing axis, a transparent closure at the upper end of the housing to permit passage of said axial light beam, a plurality of openings in said lower and upper portions of said housing disposed in spaced relation completely about the periphery of the housing, a lens mounted in each of said openings, and a plurality of spaced reflectors supported within the housing for intercepting and projecting portions of the light beam horizontally toward the lenses in said lower portion of the housing, whereby a distinctive light signal may be projected from the device having as components, a vertical beam issuing from said closure, a plurality of upwardly inclined beams issuing from the lenses mounted in the upper portion of the housing, and a plurality of horizontal beams from the lower portion of the housing, said inclined and horizontal beams being directed in many directions so as to be visible at a distance from any point throughout a 360° horizontal angle centered at the signal device.

4. A signal device for ships, comprising a tubular housing having a vertical axis, said housing having a lower portion which at least in part tapers upwardly and outwardly and an upper portion tapering upwardly and inwardly, a light projector mounted at the bottom of said housing to project a light beam along said housing axis, a transparent closure at the upper end of the housing to permit passage of said axial light beam, a plurality of openings in said lower portion of said housing disposed in spaced relation completely about the periphery of the housing, a lens mounted in each of said openings, and a plurality of spaced reflectors supported within the housing for intercepting and projecting portions of the light beam horizontally toward the lenses in said lower portion of the housing, whereby a distinctive light signal may be projected from the device having as components a vertical beam issuing from said closure, and a plurality of horizontal beams from the lower portion of the housing, said horizontal beams being directed in many directions so as to be visible at a distance from any point throughout a 360° horizontal angle centered at the signal device.

References Cited in the file of this patent
UNITED STATES PATENTS

| | | |
|---|---|---|
| 1,525,722 | Darrell | Feb. 10, 1925 |
| 1,575,571 | Gray | Mar. 2, 1926 |
| 1,589,370 | Conover | June 22, 1926 |
| 1,693,820 | Schnorheimer | Dec. 4, 1928 |
| 1,930,774 | Schlerfee | Oct. 17, 1933 |
| 1,961,995 | Weller | June 5, 1934 |
| 2,257,168 | Hammond | Sept. 30, 1941 |
| 2,308,085 | Kinney | Jan. 12, 1943 |
| 2,317,713 | Aufiero | Apr. 27, 1943 |
| 2,448,302 | Eyerkuss | Aug. 31, 1948 |

OTHER REFERENCES

Publication: "Scientific American," May 1942, pages 244 and 246.